United States Patent [19]

Sattar et al.

[11] Patent Number: 5,703,940
[45] Date of Patent: Dec. 30, 1997

[54] METHOD AND APPARATUS FOR DELIVERING CALLING SERVICES

[75] Inventors: Sohail Sattar; Steven E. Polsky, both of Irving, Tex.

[73] Assignee: InterVoice, Inc., Dallas, Tex.

[21] Appl. No.: 513,477

[22] Filed: Aug. 10, 1995

Related U.S. Application Data

[63] Continuation-in-part of Ser. No. 151,543, Nov. 12, 1993, Pat. No. 5,469,500.

[51] Int. Cl.[6] .................................................. H04M 3/42
[52] U.S. Cl. .............................. 379/201; 379/207; 379/229
[58] Field of Search ........................... 379/207, 201, 379/229, 230, 265, 202, 156, 157, 93, 94

[56] References Cited

U.S. PATENT DOCUMENTS

| | | | |
|---|---|---|---|
| 4,878,240 | 10/1989 | Lin et al. | 379/67 |
| 4,928,304 | 5/1990 | Sakai | 379/94 |
| 5,136,631 | 8/1992 | Einhorn et al. | 379/67 |
| 5,153,909 | 10/1992 | Beckle et al. | 379/265 |
| 5,241,588 | 8/1993 | Babson, III et al. | 379/201 |
| 5,247,571 | 9/1993 | Kay et al. | 379/207 |
| 5,323,452 | 6/1994 | Dickman et al. | 379/207 |
| 5,355,404 | 10/1994 | LeDuc et al. | 379/201 |
| 5,425,090 | 6/1995 | Orriss | 379/207 |
| 5,436,957 | 7/1995 | McConnell | 379/207 |
| 5,481,603 | 1/1996 | Gutierrez et al. | 379/207 |
| 5,485,511 | 1/1996 | Iglehart et al. | 379/201 |
| 5,517,562 | 5/1996 | McConnell | 379/207 |
| 5,519,772 | 5/1996 | Akman et al. | 379/207 |
| 5,526,415 | 6/1996 | Wakamoto | 379/207 |
| 5,533,115 | 7/1996 | Hollenbach et al. | 379/207 |
| 5,541,986 | 7/1996 | Hou | 379/201 |
| 5,550,910 | 8/1996 | DeJager | 379/220 |
| 5,619,562 | 4/1997 | Maurer et al. | 379/201 |

*Primary Examiner*—Harry S. Hong
*Assistant Examiner*—Scott Wolinsky
*Attorney, Agent, or Firm*—Fulbright & Jaworski L.L.P.

[57] ABSTRACT

A call processor (49) contains a service node (48) and an intelligent peripheral (42) for performing calling services requested by a telephone network service control point (24). If service control point (24) requests a calling service that is not supported by intelligent peripheral (42), or if the service logic for the requested source is stale or unavailable, intelligent peripheral (42) requests that service control point (24) or another external source transmit the necessary service logic to intelligent peripheral (42) to perform the specific calling service. Intelligent peripheral (42) caches the service logic for the calling service for a predetermined period of time according to the anticipated future need for the calling service.

50 Claims, 3 Drawing Sheets

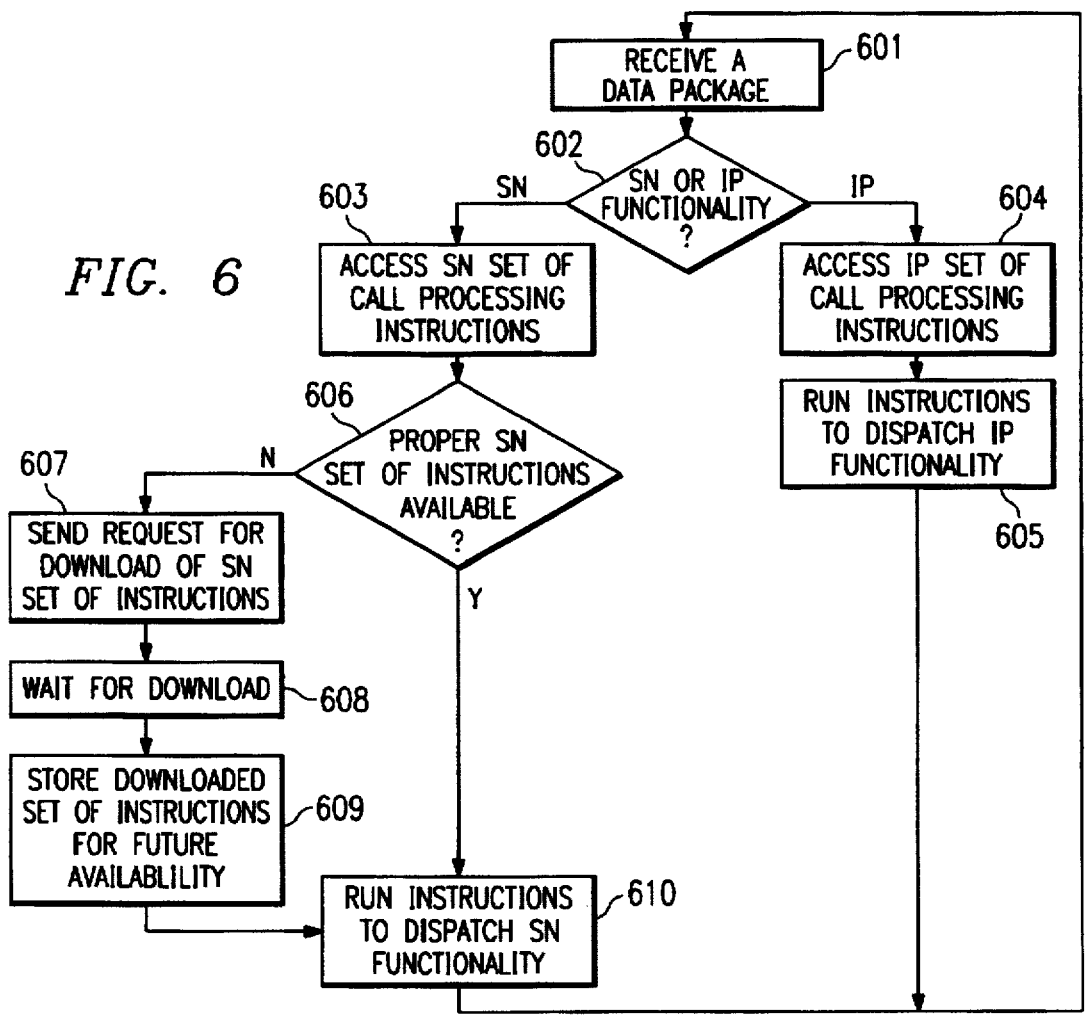
FIG. 6
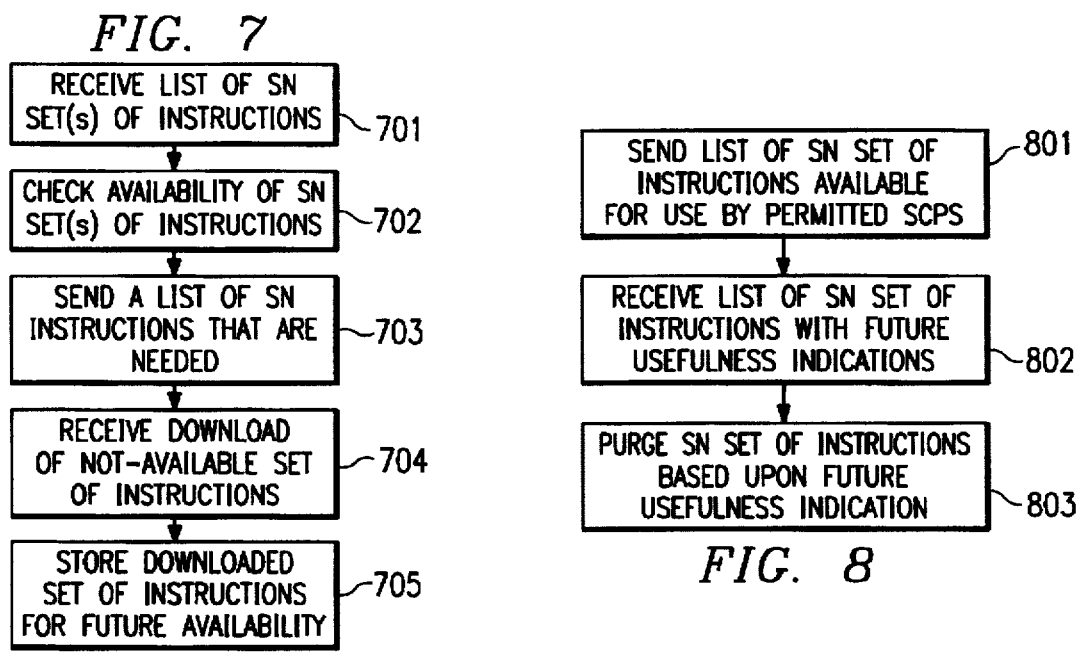
FIG. 7
FIG. 8

METHOD AND APPARATUS FOR DELIVERING CALLING SERVICES

CROSS-REFERENCE TO RELATED PATENT APPLICATION

This application is a continuation-in-part of U.S. patent application Ser. No. 08/151,543, filed Nov. 12, 1993, issued as U.S. Pat. No. 5,469,500 on Nov. 21, 1995, and entitled "METHOD AND APPARATUS FOR DELIVERING CALLING SERVICES," the disclosure of which is hereby incorporated by reference.

TECHNICAL FIELD OF THE INVENTION

The invention relates in general to systems and methods for performing call processing, and more particularly to systems and methods for delivering calling services.

BACKGROUND OF THE INVENTION

Computer-based telecommunications systems have proliferated in the last few years, in part due to the proliferation of high-speed personal computers and low cost equipment now available. When combined with high speed telephone switching lines, these systems have exhibited rapid advancements in technology and versatility. One of these advancements is the delivery of calling services. These new services range from familiar voice processing services, such as voice mail and interactive voice response, to other advanced services like flexible call forwarding, text-to-voice prompting, and voice recognition. Management and delivery of calling services is collectively referred to as call processing.

Large telephone companies now realize the potential of delivering calling services to a wider population and have begun to offer more services. Many local carriers currently offer call waiting, call forwarding, and voice mail. Most long distance companies also offer calling services, often through their 800 number services. In addition, the rapid advancements in telephony and heightened consumer demand for calling services have spurred the companies who own telephone switches and networks to design and implement new and more sophisticated services.

Telephone service providers rely on switch vendors (such as AT&T and Northern Telecom) to introduce new services through modifications at the switch level. This presents several problems. For example, switch modifications lengthen turnaround time for introducing new services because the local carrier must rely on the switch vendors to update the switch and roll out new services. When the switch vendors finally decide to introduce a new service, the introduction is normally on a national scale, decreasing any chance for differentiation and competition for new services at the local level. In addition, switch manufacturers must rewrite the software that controls the switches to introduce new calling services, further exacerbating the problems of difficult modification and slow introduction of new services.

In response, the industry developed a next generation network design called Advanced Intelligent Network (AIN) architecture. Instead of lumping all calling services into the switch, AIN architecture groups intelligence into peripheral computer systems that can more effectively and efficiently deliver calling services. The concept is to maintain the existing network of generic switches that perform call connection, but to transfer "intelligent" operations to peripheral computers. In such a manner, relatively inexpensive peripheral computers can provide more flexible and efficient call processing.

In managing and delivering calling services, these call processing computers perform a wide variety of functions, ranging from providing simple tasks or resources to managing the overall delivery of calling services. The term call processor refers to any device that executes functions necessary to deliver calling services.

The call processing of 800 calls is a simple example of how a precursor to the AIN concept operates. When a caller places an 800 call, the local switch that receives the call recognizes the number as a special call and defers to an external device for information on how to route the call. The external device is a database containing all of the 800 numbers, and the switch sends a data message to the database requesting routing information. The database performs a lookup to translate the 800 number dialed by the caller into a traditional ten digit number containing an area code and prefix, and sends the translated number to the switch. The switch then routes the call using the traditional ten digit number. AT&T and other long distance carriers maintain the continually changing 800 number database in central locations. By setting up one or only a few databases, any changes in 800 number service can be made simply and efficiently without having to reprogram every switch each time the database changes. The concept of the switch deferring to a peripheral device to determine how to route the call, rather than relying on its hard-coded logic, is typical of a precursor to the AIN architecture.

The concept of AIN, however, has evolved, and thus takes on several definitions. Early attempts to deliver calling services, termed hybrid AIN architecture, off-load a portion of the switch intelligence, but still require the switch to maintain direct control over call management. The 800 number service is typical of this early architecture, where the switch does not relinquish control over the call but requests data from a central database.

Current AIN architecture delivers calling services through use of service control points (SCPs). An SCP receives a data package from the switch when the switch requires assistance in routing the call or providing a calling feature. Thus, the intelligence to process calls is off-loaded from the switch to the SCP. Local carriers can design and release new calling services by modifying the SCP software, which provides an advantage over the hybrid AIN architecture. The SCP, rather than the switch, assumes control over call processing.

The SCP in the current AIN architecture receives data packages from the switch and manages call processing. The SCP also delegates many of the tasks of call processing to "intelligent" peripherals (IPs). IPs provide a variety of resources, such as voice prompting, digit collecting, and voice recognition, while operating as slave processors to the SCP. The SCP defers a small portion of the call processing to an IP, but regains control of the call after the IP executes a task.

A current AIN architecture may also include a service node (SN), which is a stand-alone platform that autonomously delivers calling services. An SN is connected to the switch and dedicated to deliver a particular calling service, such as voice mail, automated attendant, or fax server functions. Unlike the IP which operates as a slave to the SCP, the SN operates for the most part autonomously. The telecommunications switch actually patches the call to the SN and the SN processes the call autonomously without much direction from the switch or the SCP. Therefore, AIN architecture currently supports using both a dedicated SN for autonomously delivering a particular calling service and an SCP with access to the resources of an IP for managing delivery of calling services.

In order for the SCP to utilize an IP, the SCP must know the set of resources supported by that particular IP. Likewise, care must be taken to ensure that the SCP and IP are using the same resource versions. Otherwise, the calling service could fail because the IP lacks a resource required by the SCP or because the resource has become stale. Thus, adding a new calling service to current AIN architecture requires that both the SCP and IP be updated with identical versions of resources necessary to implement the service, and further requires that mismatched resources be discarded.

Thus, the current landscape of call processing at the local carrier level continues to evolve, with several variations in existence. Consequently, a need has arisen for a system that is compatible with current and unsettled industry standards, and yet easily modifiable and reconfigurable to meet the future specifications of switch manufacturers, local carriers, and their customers.

SUMMARY OF THE INVENTION

In accordance with the present invention, a method and apparatus for delivering calling services are provided which substantially eliminate or reduce the disadvantages and problems associated with prior systems that deliver calling services.

The present invention contemplates call processing and a call processor that autonomously deliver specific calling services while also providing call processing resources to SCPs and other switch technology.

In accordance with one aspect of the invention a call processor delivers calling services to callers. The call processor includes a service creation environment to create a service logic table for storing call processing instructions. The call processor also includes a service logic executive with access to the service logic table for executing the call processing instructions. In addition, a communications link allows transmission of a data package to the call processor. When the call processor receives the data package, the service logic executive accesses the service logic table and executes the call processing instructions responsive to the data package.

More specifically, the service creation environment allows manipulation of vectors, objects, and events to construct the call processing instructions. In a further embodiment, the service creation environment comprises a graphical interface that allows manipulation of the vectors, objects, and events to create a visual representation of call processing instructions.

In accordance with another aspect of the present invention a method is disclosed for delivering a calling service to a caller. The method first generates call processing instructions. The next step receives a data package at a call processor. The method then executes the call processing instructions in response to the data package.

In accordance with another aspect of the present invention a call processing architecture is disclosed for delivering calling services to callers. A call processor executes a service logic table generated by a service creation environment. The call processing architecture also contains external information sources coupled with distinct and modular servers for connecting the call processor to the external information sources. The servers provide information to the call processor for delivering a calling service. In addition, the servers operate independently from the call processor and are reconfigurable without effecting the functionality of the call processor.

In accordance with another aspect of the present invention, a call processing architecture is disclosed for delivering calling services to callers. In a preferred embodiment, a call processor containing a group of basic resources, such as DTMF (touch-tone) senders/receivers, voice synthesizers, voice recognizers, etc., receives a request from an external processor to execute a specified service logic. The service logic defines a higher level resource performed by the call processor. The higher level resource may be comprised of basic resources or a combination of basic resources and other higher level resources. If a higher level resource called for by the external processor is not available to the call processor, the call processor may request that the external processor deliver the service logic of the higher level resource either directly or indirectly from another storage device.

In another embodiment of the present invention, the external processor may automatically deliver the service logic to the call processor whenever a request is sent to the call processor to perform a higher level resource, whether or not the service logic is available to the call processor.

In still another embodiment of the present invention, the call processor may cache service logic in a dedicated, readily accessible storage device according to a life expectancy indicator received from the external processor, from a third device, or determined by the call processor itself. The life expectancy indicator indicates to the call processor the probable length of time that the call processor will need to retain the cached service logic.

A technical advantage of the present invention is call processing that is easily modifiable, upgradeable and reconfigurable to adapt to new telecommunication services.

Another technical advantage of the present invention is call processing that is compatible with current and unsettled call processing industry standards.

Another technical advantage of the present invention is a call processor operable to provide call processing resources to a service control point while also operable to provide a specific calling service, such as voice mail.

Another technical advantage of the present invention is a graphical service creation environment that allows manipulation of vectors, objects, and events to construct a visual representation of call processing instructions.

Another technical advantage of the present invention is call processing that allows development and delivery of new calling services without interruption of existing service.

Another technical advantage of the present invention is a call processing architecture containing a plurality of distinct and modular servers operating independently from the call processor and reconfigurable without affecting the functionality of the call processor.

Another technical advantage of the present invention is a call processing resources architecture that is dynamically configurable to allow for the creation of new resources or modifications of existing resources by combining existing resources or creating new ones and arranging them to form virtual resources.

Another technical advantage of the present invention is a call processor that is easily modifiable and reconfigurable by the downloading of program instructions from an external source.

Another technical advantage of the present invention is a call processor that knows when its instructions are old and requests new instructions, either for a single call, or for all future calls.

Another technical advantage of the present invention is a call processor that is responsive to an external determination that certain of its instruction sets need to be replaced and to thereupon accept modified instructions for handling future calling connections.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6, 7 and 8 show flow diagrams of the operation of a call processor in which instructions and data are downloaded from an external source from time to time.

DETAILED DESCRIPTION OF THE INVENTION

Figure 1:
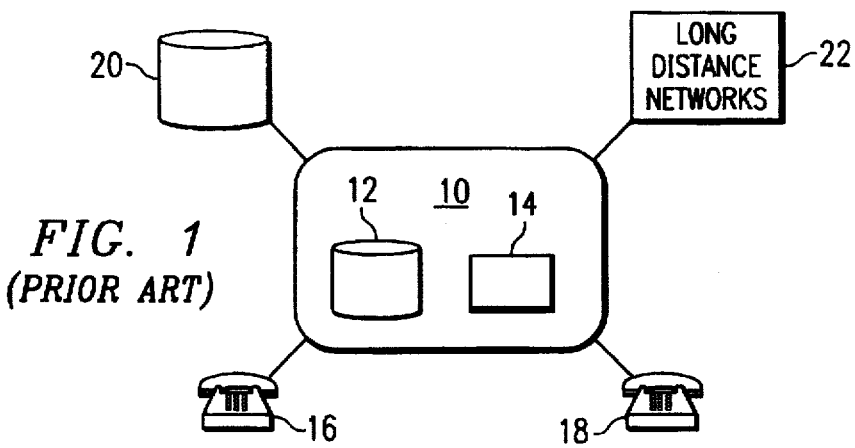
FIG. 1 is a block diagram of the major elements of a hybrid precursor to the AIN architecture.

FIG. 1 represents operation of a telecommunications switch 10 that is not under the control of a service control point (SCP). Switch 10 is a generic telecommunications switch for routing calls, such as those manufactured by switch suppliers AT&T, Northern Telecom, and others. Switch 10 is typically installed in a local carrier system that receives and routes calls of local customers.

Switch 10 contains a switch database 12 that stores customer profile information that may contain a list of specialized services or long-distance carriers. For example, switch database 12 may contain information indexed by phone number showing that a customer currently subscribes to call waiting and uses MCI as a long-distance carrier. Switch 10 also contains hard code 14 that manages the operation of the switch. Hard code 14 comprises programming steps, written in C or any suitable programming language, that are designed to specifically control the operation of switch 10. This software varies in complexity depending on the functionality of the switch and requires modification to add new capabilities to switch 10. Therefore, a new version of hard code 14 is required to introduce a new calling service.

A simple cross-matrix switch that provides few calling services may simply receive calls from a calling party 16, access the customer profile information in switch database 12, and route the call based on this information to a called party 18. This would be the typical operation of switch 10 in routing a local call.

Switch 10 in FIG. 1 can also perform calling services such as call waiting, and can route long distance numbers to the proper long-distance carrier by accessing local customer profile information in switch database 12. For example, call waiting may be initiated at switch 10 when calling party 16 places a call and then receives another incoming call. Switch accesses the customer profile information in switch database 12 to determine that calling party 16 subscribes to the call waiting service. If calling party 16 subscribes to call waiting, then switch 10 sends the characteristic call waiting tone to calling party 16. Similarly, for a long-distance call, switch 10 accesses the customer profile information in switch database 12 to determine the proper long-distance network 22 to route the call through. For both call waiting and routing of long-distance calls, switch 10 accesses switch database 12 to process the call without consulting or transferring control to a peripheral device. This is the typical operation of a telecommunications switch performing simple call processing with little or no Advanced Intelligent Network (AIN) architecture.

Hard code 14 may also direct switch 10 to deliver more advanced services using a hybrid AIN architecture. For example, hard code 14 may direct switch 10 to issue a trigger when it cannot effectively route a call without outside help. A data package requesting help in placing the call or performing the calling service is then sent to a peripheral device outside switch 10. A peripheral device can be any call processor, such as a service control point (SCP), service node (SN), intelligent peripheral (IP), customer profile database, long-distance call router, or any other suitable device.

For example, switch 10 accesses a peripheral device when calling party 16 wishes to place an 800 call. In such a case, calling party 16 goes off hook, and this action itself may generate a trigger within the switch to activate a dual tone multifrequency (DTMF) decoder. The DTMF decoder resource can reside in the switch or in a peripheral device accessible by the switch. Calling party 16 then dials the digits of the 800 number and switch 10 decodes the 800 number and issues a data package requesting assistance from translator database 20 to place the call. Translator database 20 is typically located at a remote location and maintains a list of 800 numbers and a corresponding routing numbers used to place a call. For example, the number 1-800-123-4567 may be assigned to called party 18, a company located in Dallas, Tex. If the call was routed by the 800 number, then all the switches in the nation would have to maintain information on how to route the call. Instead, translator database 20 maintains this list in a central location and sends switch 10 a ten digit number for routing the call using the established network of area codes and prefixes. In this example, the 800 number dialed by calling party 16 may be translated to (214) 555-1234 and switch 10 would then understand how to route this call to called party 18 in Dallas, Tex.

By off-loading some of the intelligence of switch 10 to a central location, in this example the translation of all 800 numbers, switch 10 becomes less intelligent and more reliant on peripheral devices to process a call. However, switch 10 only establishes a data communication with translator database 20 and does not open a voice line or route the call to the peripheral device. Furthermore, switch 10 independently recognizes the 800 number, generates a trigger, and directly accesses a particular database for information on how to route the call. Switch 10 does not relinquish control over the call. This hybrid AIN architecture transfers some of the intelligence from the switch to other peripheral devices but does not use a service control point or other separate peripheral devices to maintain and design new services.

The foregoing discussion of FIG. 1 describes a simple switch capable of routing local, 800, and long-distance calls and performing simple calling services such as call waiting. In such a system, any calling services provided to customers by the local carrier require modification of lines of hard code 14 within switch 10. This system, therefore, presents difficulties since a new version of hard code 14 must be installed for each new service.

Figure 2:
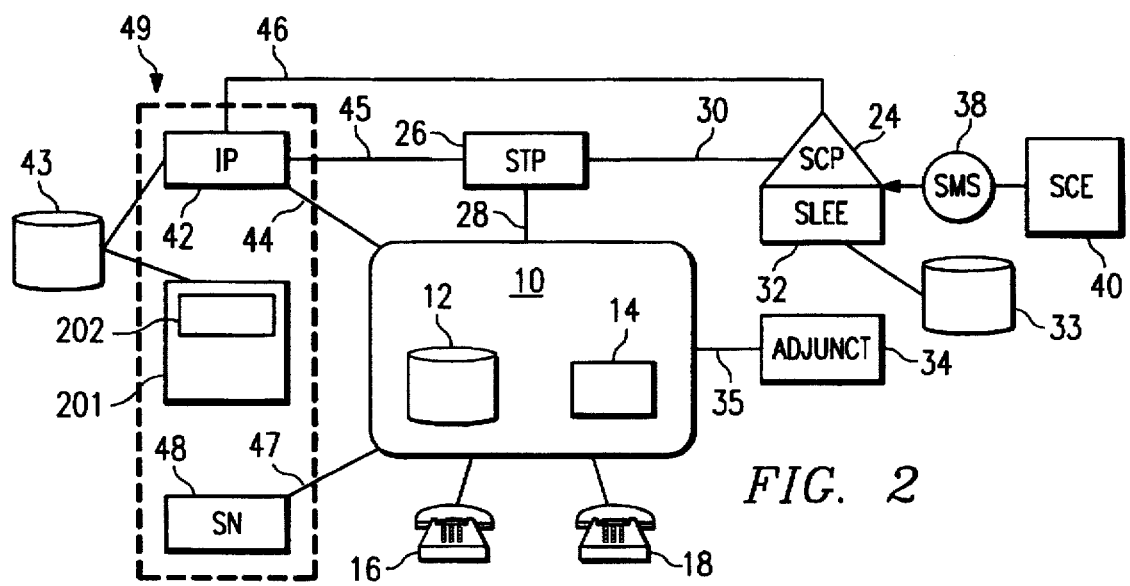
FIG. 2 is a block diagram of the major elements of a current AIN architecture.

FIG. 2 represents AIN architecture which utilizes a service control point (SCP) to manage calling services. The present invention, which will be discussed in detail in connection with FIGS. 3–5, relates to call processor 49, shown functionally by the dashed lines, for delivering calling services in the general architecture of FIG. 2.

In the architecture of FIG. 2, switch 10 contains switch database 12 and hard code 14, but at least some switch intelligence and management functions are off-loaded to SCP 24. Switch database 12 may still store customer profile information to facilitate call routing and delivery of simple calling services. Hard code 14 includes a call model with a list of switch trigger points. Upon certain trigger events switch 10 sends a data package to SCP 24 to request aid in processing the call. The data package is transferred from switch 10 to a signal transfer point (STP) 26 along an SS7 data line 28. STP 26 connects switch 10 to a local or nationwide SS7 data network that facilitates efficient processing of calls. STP 26 passes the data package to SCP 24 via SS7 data line 30. SCP 24 supports data communications over SS7 data line 30, but does not support voice communications.

Upon receipt of the data package from switch 10, SCP 24 processes the call using a service logic execution environment (SLEE) 32. SCP 24 is traditionally a reliable, fault tolerant computer, such as those manufactured by Tandem or Sequoia. SLEE 32 software runs on SCP 24 which manages and delivers calling services in response to data packages received by switch 10.

Also shown in FIG. 2 is adjunct 34, directly connected to switch 10 through data line 35, which may support both data and voice communications. Adjunct 34 provides simple call processing functions to switch 10, such as the lookup feature for 800 number translation described with reference to FIG. 1.

SCP 24 is connected to a service management system (SMS) 38 which is a provisioning system that controls the introduction of new calling services. SMS 38 receives modifications to SLEE 32 from a service creation environment (SCE) 40.

Also shown is resource database 33 which stores instructions for executing various call processor 49 services. These instructions are stored in a format readable and executable by call processor 49. Like SLEE 32, resource database 33 is maintained by SMS 38 and the instructions are received from SCE 40. Therefore, in this AIN architecture new calling services are introduced by modifying the control software of SLEE 32 and resource database 33 of SCP 24.

In operation, network administrators design new calling services on SCE 40, which are transferred to SMS 38 for provisioning on SCP 24. Switch 10 issues data packages upon certain trigger events. SCP 24 responds to these data packages and manages the call processing based on the current version of SLEE 32.

Also shown in FIG. 2 is intelligent peripheral (IP) 42 connected to switch 10 along voice and data link 44 using an Integrated Services Data Network (ISDN) link or other appropriate voice and data communications protocol and hardware. IP 42 may also be connected to STP 26 along data link 45, and SCP 24 along data link 46. Therefore, SCP 24 and IP 42 may communicate directly using data link 46 or indirectly through data link 30, STP 26, and data link 45. Alternatively, data communication between SCP 24 and IP 42 may be routed through switch 10 using voice and data link 44, data link 28, STP 26, and data link 30. Data links 28, 30 and 45 are preferably tied into the local or nationwide SS7 network through STP 26. It is understood, however, that these data links can accomplish data communication using any suitable protocol and hardware, including, but not limited to: transmission control protocol/Internet protocol (TCP/IP), file transfer protocol (FTP), fiber digital data interface (FDDI), and synchronous protocol X.25. Similarly, data link 46 can be SS7, TCP/IP, FDDI, X.25, a high speed bulk data transfer link or any other synchronous or asynchronous data link. It should be understood that the listing of various communications links is exemplary only, and more or less than all the links shown may be used.

IP 42, unlike SCP 24, supports voice as well as data communications. For example, IP 42 can transmit and receive voice to and from switch 10 over link 44. Therefore, IP 42 provides SCP 24 with the basic, lower level resource.1 to transmit voice announcements to a party, collect DTMF digits, recognize voice, or send tones, among other things, over link 44.

Also shown in FIG. 2 are means for requesting 201 and means for determining 202. Means for determining 202 is used by the system to determine if the proper program logic is contained within the call processor 49. Determining means 202 may operate based upon certain time periods or it may be controlled by certain data received from the service control point 24. Requesting means 201 is capable of requesting additional program logic from a source external to call processor 49. The external source of additional program logic may be service control point 24.

IP 42 is dependent on SCP 24 for its instructions. In operation, SCP 24 sends a data package request to IP 42 along any of the possible communication links described above. The data package request refers to a specific version of a higher level call processing resource (or service) to be executed by IP 42. The higher level resource may be voice dialing, voice mail, important person prompting, or some other service that requires the execution of a sequence of one or more of the basic lower level resources, such as DTMF decoding, voice synthesis, or voice recognition. If IP 42 has the service logic necessary to execute the specified version of the higher level resource, IP 42 responds to the data package request by executing the higher level resource. After performing the higher level resource, IP 42 transmits a data package back to SCP 24 indicating completion of the resource and returning any necessary data or result. SCP 24 maintains control of the call at all times and directs IP 42 to perform call processing resources not supported by SCP 24.

If IP 42 lacks the service logic necessary to execute the version of the higher level resource specified by the data package request from SCP 24, IP 42 sends a message to SCP 24 requesting the necessary service logic (i.e., parameters, instructions, etc.) for executing the higher level resource. In response, SCP 24 reads the resource instructions from resource database 33 and downloads the instructions to IP 42. After receiving the service logic instructions, IP 42 performs the higher level resource defined by the instructions.

In addition, IP 42 may cache the service logic instructions in a dedicated database 43 which IP 42 may readily access. IP 42 will cache the service logic for the higher level resource according to a life expectancy indicator associated with the resource. The life expectancy indicator may be determined by IP 42 itself or may be received from SCP 24 or from another external device. IP 42 also maintains a list of all higher level resources for which instructions are cached in database 43.

In an alternative embodiment, SCP 24 sends a list of required resources to IP 42 when the link between the two components is first established. Then, IP 42 requests that SCP 24 transmit service logic for any higher level resources missing from database 43.

In another embodiment of the present invention, IP 42 may automatically send a list of all higher level resources in database 43 to SCP 24 when the link is first established. SCP 24 responds by transmitting the missing service logic of any higher level resource that is needed or is likely to be needed.

In still another embodiment of the present invention, SCP 24 automatically sends to IP 42 the service logic of the higher level resource that SCP 24 is requesting as soon as the link is established, regardless of whether or not IP 42 already has the necessary service logic.

Moreover, IP 42 can be configured to periodically update or purge database 43. In one embodiment, IP 42 may delete all higher level resources that are not used within a predetermined time period. Alternatively, IP 42 may download a predetermined set of higher level resources from SCP 24 to database 43 after a predetermined number of days.

Call processing of a new service (i.e., a new higher level resource) will illustrate the master-slave relationship between SCP 24 and IP 42. The new service, called "important person prompting", is similar to call waiting, but instead of using the characteristic call waiting tone, the customer receives the spoken name of particular parties waiting to be connected. This service allows the customer to receive the identity of the party before accepting a second call. To set up this service, the names and numbers of the "important persons" will be input to SCP 24.

To initiate important person prompting, calling party 16 places a call to called party 18. When switch 10 receives another call destined for calling party 16, switch 10 accesses the customer profile of calling party 16 from switch database 12 and realizes that calling party 16 subscribes to important person prompting. Switch 10 then sends a data package to SCP 24 through STP 26. Alternatively, switch 10 may issue a data package to SCP 24 requesting aid, and SCP 24 can determine that calling party 16 subscribes to important person prompting. SCP 24, which is running SLEE 32, then processes the call by sending IP 42 a data package containing a request to play the name of the listed important person attempting to call. This data package can be sent from SCP 24 to IP 42 using any of the possible communications links described above, or some other link. In this example, the package requests that IP 42 perform a specific version of a basic, lower level voice synthesis resource that generates the spoken name. Thus, the data package sent to IP 42 may contain the name of the resource along with the letters of the "important person's" name. SCP 24 also sends a data package to switch 10 to open a voice channel on link 44 between IP 42 and switch 10 for the announcement.

Next, IP 42 responds to the resource request from SCP 24. IP 42 either performs the resource or, if the resource instructions are not cached within database 43, requests that the service logic be transmitted to it. Thus, IP 42 responds to a resource request from SCP 24 (in this case a text-to-voice operation) and acts as a slave of SCP 24 in delivering the requested resource. Using this architecture, IP 42 may perform several different functions including voice recognition, fax retrieval and reporting, DTMF digit collection, and text-to-voice, among other functions. In delivering these resources, IP 42 depends on SCP 24 to initiate and oversee the call processing, as well as to provide necessary resource service logic.

Also shown in FIG. 2 is service node (SN) 48 connected directly to switch 10 through voice and data link 47 using ISDN or other appropriate voice and data communications protocol and hardware. SN 48 performs a specific call processing function autonomously. For example, SN 48 may support voice mail in the following manner. Switch 10 generates a data package representing a request for voice mail made by a caller. Alternatively, SCP 24 may directly receive the request from the caller or independently determine that the caller desires to access voice mail. SCP 24 sends a data package requesting switch 10 to access SN 48 to perform the voice mail function. SCP 24 could also send the data package and resource instructions directly to SN 48 as discussed above with regard to IP 42. SN 48 then delivers the voice mail service without additional help from SCP 24 or switch 10. SN 48, therefore, performs a narrow but autonomous call processing function. Call processor 49 of the present invention, shown functionally by the dashed lines in FIG. 2, can operate in slave mode like IP 42 to provide call processing resources to SCP 24 or in autonomous mode like SN 48 to deliver a specific calling service, such as voice mail.

Figure 3:
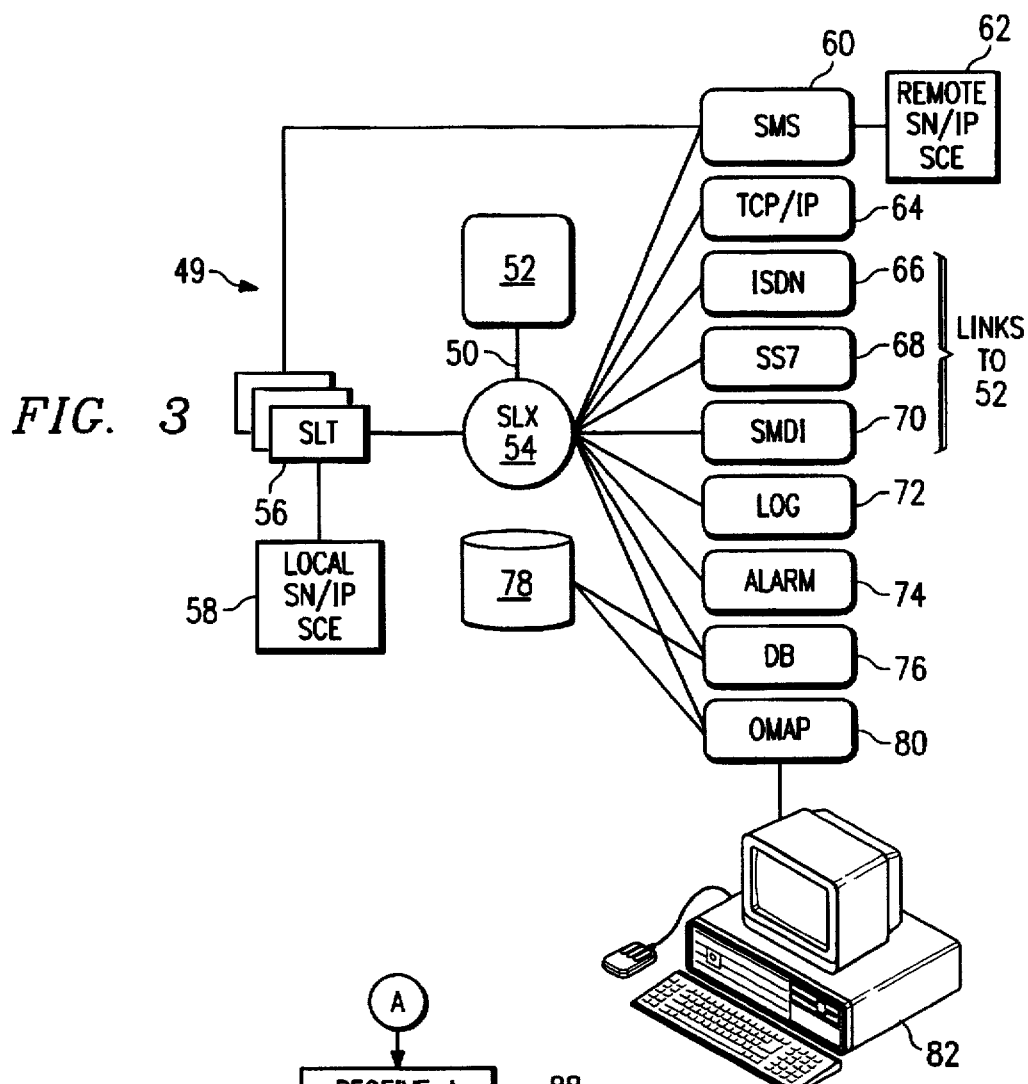
FIG. 3 is a block diagram of the major elements of a call processor constructed according to the teachings of the present invention.

FIG. 3 shows the major elements of call processor 49 capable of providing a variety of calling services with or without the direction of SCP 24. Link 50 connects the public switch telephone network 52 to service logic executive (SLX) 54 of call processor 49. Network 52 includes, for example, switch 10, SCP 24, and STP 26, among other telecommunication devices. The various components of network 52 may connect directly to SLX 54 or through a variety of servers, as described below. SLX 54 is the central processor of call processor 49 and accesses service logic tables (SLT) 56 generated from a local service node/ intelligent peripheral service creation environment (SN/IP SCE) 58. SLT 56 can be stored in random access memory (RAM), read only memory (ROM), or any suitable memory or storage device and can store programs and logic instructions in any format to be executed under control of a plurality of well-known operating systems or application programs.

SLX 54 may also communicate with network 52 and other telecommunication devices, call processors, or other data processing devices through various servers. For example, a service management system (SMS) interface 60 allows updating of SLT 56 from a remote SN/IP SCE 62. TCP/IP server 64 connects SLX 54 to other devices on a local area network, which may be provided by link 46, for example. ISDN server 66 connects SLX 54 to other devices on an integrated services data network, which may be provided by links 44 and 47, for example. In addition, SS7 server 68 allows SLX 54 to connect to a local or nationwide SS7 data network, which may be provided by link 45, for example. SLX 54 may also connect to SMDI server 70 for data signaling in voice mail like applications, log server 72 for usage statistics, traffic, and billing functions, and alarm server 74 for managing and manipulating alarm sense points. Database server 76 allows SLX 54 to access database 78 and retrieve information to aid in call processing, as discussed above. Database 78 can be external or internal to call processor 49. Operations, maintenance, administrative and provisioning (OMAP) server 80 allows SLX 54 to connect to input/output device 82 for analyzing, monitoring, and trouble shooting. OMAP server 80 also allows access to and modification of database 78. The listing of these servers is exemplary only, and other servers may be used for various functions without departing from the intended scope of this invention.

Call processor 49 stores call processing instructions in SLT 56 to handle and route calls. The call processing instructions in SLT 56 are developed in local SN/IP SCE 58, downloaded from SCP 24 or transferred from a remote SN/IP SCE 62 through SMS server 60. For simplicity, any subsequent reference to SN/IP SCE 58 contemplates both local and remote operation. In a particular embodiment, SN/IP SCE 58 allows development of call processing instructions for a vectored-state architecture by configuring an arrangement of vectors, objects, and events. U.S. Pat. No. 5,243,643, issued to Sattar et al. and incorporated herein by reference, discloses use of vectors, objects, and events in developing call processing applications.

In one embodiment, SN/IP SCE 58 utilizes a graphical interface that allows manipulation of vectors, objects, and events to construct visual representations of call processing instructions. The vectors, objects, and events provide an intuitive and flexible medium for system administrators to design new call processing services. Unlike the hard code traditionally used in call processing systems, the graphical interface allows construction and modification of calling services without rewriting lines of software.

The call processing instructions generated in the SN/IP SCE 58 are downloaded to the SLT 56 for use in processing calls. As an example, one call processing instruction set may define a new service for all subscribers such as flexible call forwarding or a customized service for a particular subscriber such as a voice response service for a bank. Another call processing instruction set may define a resource, such as digit collection or voice synthesis, that can be provided to a service control point for processing calls. The present invention contemplates simultaneous storage of multiple sets of call processing instructions in SLT 56 to support a wide variety of functions performed by call processor 49. Furthermore, call processor 49 may contain one or more SLTs with each SLT maintaining one or more sets of call processing instructions.

SN/IP SCE 58 maintains a library of call processing instruction sets that may be represented by vectors, objects, and events that can be easily retrieved and combined. This modular or building block design allows efficient modification or construction of customized systems capable of performing a variety of call processing functions without rewriting the call processor software. For example, a customer may desire a call delivery system to route incoming calls to an extension, an automated attendant, or a voice mail facility, depending on the caller's preference. A system administrator can easily and quickly construct such a customized call processing system by accessing call processing instruction sets from the library for standard call delivery, automated attendant, and voice mail. The process is further simplified by graphically manipulating vectors, objects, and events representing the call processing instruction sets.

The user may define objects on a microscopic scale to perform single functions. However, objects may also be grouped to facilitate call processing operations on a higher level. Objects may be detailed, such as a spoken name contained in a voice mail application, or broad, such as an entire mailbox containing all voice and data messages, facsimiles, or electronic mail for an individual.

Similarly, the user can microscopically define vectors for a high degree of detail, while at the same time group several vectors together in order to hide unnecessary detail. For example, a detailed vector may contain call processing instructions to play a spoken name from within a voice mail application or the date and time that the message was sent, while another vector may contain call processing instructions to play only a particular desired segment of the message. An SN can access a group of detailed vectors by a single reference and command a voice mail envelope to play the entire contents in a manner determined by arrangement of the detailed vectors within the group. The present invention encompasses all such applications of objects, vectors, and events to process calls.

A call processor using vector, object, and event building blocks becomes an object-oriented, event-based system adaptable to perform any call processing functions. The building blocks of any calling service are programmed in most any programming language, such as C-language, but call service developers merely use the building blocks by reference and need not concern themselves with the details of the programming code. Therefore, calling service developers who are not fluent in scripted computer languages can develop applications quickly and provide layered multiple applications as particular needs change without having to be confined by the specifications of an earlier application and without reprogramming lines of software.

The call processing instructions are designed in SN/IP SCE 58, downloaded into SLT 56, and run by SLX 54. The system administrator can modify SLT 56 without interrupting the functionality of SLX 54 in processing calls. Once a data package is received by call processor 49, SLX 54 accesses and executes the proper call processing instructions in SLT 56 in response to the data package. Call processor 49, therefore, can handle any call processing task and operate autonomously like a service node, but with greater flexibility and configurability, or it may make its call processing resources available to the SCP for an IP role, as will be discussed.

During development of AIN architecture, the regional telephone companies established a standard describing the exact functionality of an IP. Technical Advisory 1129 published by Bellcore describes the current standard used in the industry for the messages an IP should understand and the resources an IP should provide to an SCP. By using call processing instructions designed in SN/IP SCE 58 and loaded in SLT 56, the present invention can be easily configured to emulate current TA 1129 standards. Furthermore, the user can easily add, remove, and modify resources. In such a manner, the present invention provides a call processing resources architecture that is dynamically configurable to allow for creation of new resources or modification of existing resources. The invention also contemplates arranging or combining existing or newly created resources to form virtual resources. Therefore, call processor 49 can operate as an autonomous and flexible service node, but can also operate in a slave mode and deliver a variety of call processing resources to an SCP.

In one embodiment, SLT 56 maintains a call processing instruction set that allows call processor 49 to emulate current TA 1129 standards of an IP. Additional call processing instruction sets designed in SN/IP SCE 58 and/or downloaded to SLT 56 can provide one or more call processing tasks similar to the tasks currently provided by an autonomous SN. Therefore, call processor 49 can simultaneously maintain call processing instruction sets that provide the functionality of an IP or an SN. Call processor 49 operates both as an autonomous SN and as a slave IP and, therefore, must handle data packages from a variety of sources and properly dispatch an IP or SN functionality in response to the data package received. Referring to FIG. 2, call processor 49, shown in dashed lines, provides the dual function of IP 42 and SN 48. It is further understood that the present invention contemplates delivering the functionality of multiple IPs or multiple SNs.

The architecture of FIG. 3 allows existing SNs to be equipped with IP functionality to take advantage of new calling services introduced at SCP 24. Furthermore, by exploiting the configurability and flexibility of SN/IP SCE 58 and SLT 56, call processor 49 can provide new resources beyond those currently envisioned in Bellcore's TA 1129 standards. These new resources developed in call processor 49 will likely include more complicated and autonomous tasks that alleviate some of the processing requirements of SCP 24. Eventually, much of the functionality of SCP 24 may be downloaded to peripheral devices, and call processor 49 can adapt to these changes efficiently and effectively.

A variety of SLX servers connect to SLX 54 through local area network socket links, thereby allowing the servers to be selectively stripped off and added as call processing hardware evolves. The on-loading or off-loading of services to or from call processor 49 as AIN architecture develops will not effect the operation of SLX 54, SLT 56, or SN/IP SCE 58. Therefore, the architecture shown in FIG. 3 can easily be modified or reconfigured to meet future calling service requirements by modifying SLT 56 or modifying functions performed by existing SLX servers.

The operation of call processor 49 may also depend on the current state of switching and call processing hardware. For example, call processor 49 can receive a data package directly from switch 10 and autonomously deliver a particular calling service. Alternatively, switch 10 can send a data package to SCP 24, which then directs a data package to call processor 49 requesting a call processing resource. Because of the module servers and configurable SLT 56, call processor 49 can adapt to a variety of data packages received from a variety of switching and call processing hardware.

Figure 4:
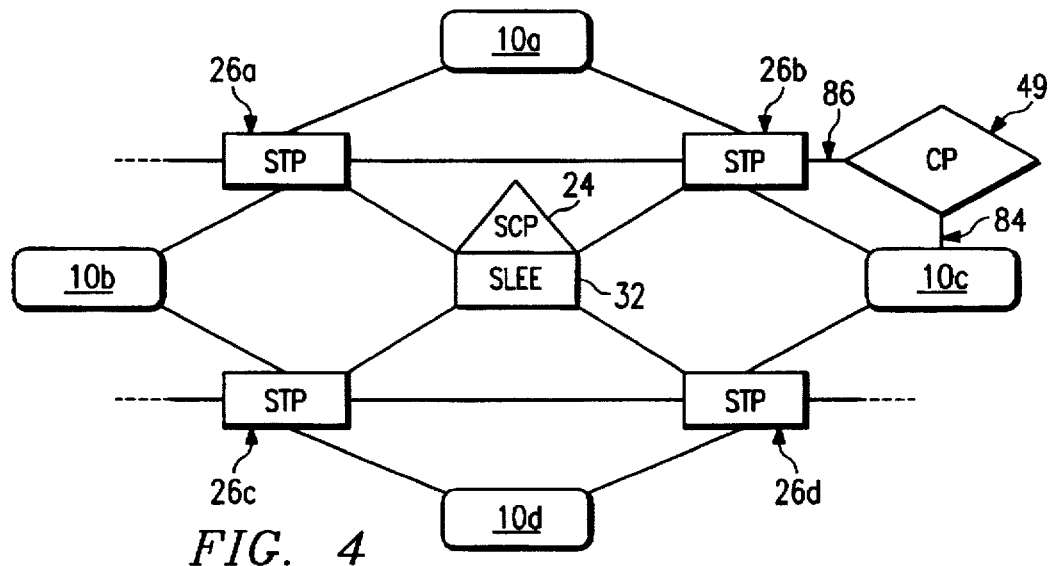
FIG. 4 is a block diagram of a telecommunications network equipped with a call processor constructed according to the teachings of the present invention.

Now referring to FIG. 4, a telecommunications network comprises switches 10a–10d connected to a distributed local or nationwide SS7 network through signal transfer points 26a–26d. The SS7 network allows data packages to be passed among the elements of the telecommunications network. The SS7 network is arranged to provide redundant pathways in the event of an STP or data link failure. For example, switch 10b may normally pass a data package to switch 10c through STP 26a and STP 26b. If, however, STP 26b malfunctions, switch 10b can reroute the data package through STP 26c and STP 26d. SCP 24 equipped with SLEE 32 also connects to the SS7 network in redundancy through STPs 26a–26d. In this embodiment SCP 24 provides call processing services for switches 10a–10d.

An exemplary call processor 49 services switch 10c through voice and data link 84. In this manner call processor 49 can act as an autonomous service node and provide calling services such as voice mail to callers patched through switch 10c. Data link 86 connects call processor 49 to the SS7 data network and allows call processor 49 to provide call processing resources to SCP 24. For example, SCP 24 sends a data package through STP 26b to call processor 49 requesting a text-to-voice announcement to a caller patched through switch 10c. Call processor 49 provides the resource and routes a data package back to SCP 24 through STP 26b signifying completion of the task. SCP 24 can also send a data package through STP 26b requesting call processor 49 to deliver voice mail services to a caller patched through switch 10c. Data packages may be sent over any of the data links 44, 45, 46, or 47. Call processor 49 can also provide redundant resource provisioning over the SS7 data network to a variety of telecommunications hardware. Therefore, the architecture of FIG. 4 supports the dual functions of call processor 49 as an SN and an IP.

Figure 5:
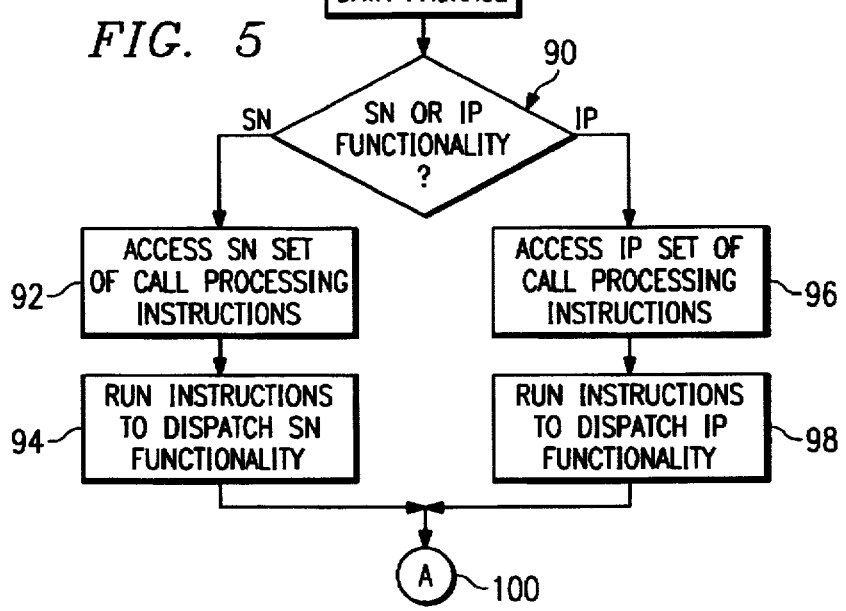
FIG. 5 is a flow diagram of the operation of a call processor constructed according to the teachings of the present invention.

FIG. 5 is a flow diagram illustrating the dual operation of call processor 49 as an SN and an IP. Call processor 49 receives a data package at step 88. As described above, the data package may come from a variety of sources over a variety of data communications links. Furthermore, the data package can represent a feature request or response, a resource request or response, a query request or response, or any other communication of data between devices in a call processing environment.

Call processor 49 then decides at step 90 whether the received data package requires SN or IP functionality. If SN functionality is required, call processor 49 proceeds to step 92 and accesses the appropriate SN set of call processing instructions to perform the task. Call processor 49 then proceeds to step 94 and runs the call processing instructions to dispatch the SN functionality. The process is terminated at step 100 where call processor 49 may generate another data package to be sent to another device, such as the originator of the received data package.

If IP functionality is required, call processor 49 accesses the desired IP set of call processing instructions at step 96. Call processor 49 then proceeds to step 98 where the call processing instructions are executed to dispatch the IP functionality. The processing is concluded at step 100, where call processor 49 may generate a second data package to be sent to another device, such as the originator of the received data package. Therefore, FIG. 5 illustrates the dual operation of call processor 49 to dispatch both SN and IP functionality.

Call processor 49 offers flexible and inexpensive call processing, compatibility with current AIN architecture, and simple upgrading and reconfiguring to provide more calling services in the future. This design can deliver calling services autonomously or operate in slave mode and deliver call processing resources to an SCP. In addition, by using configurable and modular components, call processor 49 can be easily integrated into a variety of call processing hardware.

Turning now to FIG. 6, there is shown a modification of FIG. 5, with the modification on the service node at block 602 where a data packet is received via block 601. Having determined the Service Node ("SN") functionality, the branch goes to the left to block 603. This is the same as block 92 (FIG. 5) but here is where the operation changed. In block 606 it is determined if the proper service node set of instructions is available. If it is, the system goes to block 610 to run the instructions to dispatch the service functionality. However, if the system goes to block 607, then the system must obtain the proper instruction set.

The system then waits for the download to be completed, block 608.

After the download has completed, block 609 stores the downloaded set of instructions for future availability as well as for use now. The storage is based upon one of several criteria, including instructions that came in the package containing the download as to expected future use. In some cases the instructions can be only locally stored and temporarily buffered only, or can be stored for a period of time or while a specific "change" instruction is received.

After the instructions are available, then block 610 executes those instructions. Thus, blocks 607 through 610 basically send the request, wait for the download to complete, make those instructions available to the call processor and execute those instructions.

Blocks 604 and 605 are the same as blocks 96 and 98, respectively, of FIG. 5.

In blocks 607, 608 and 609, it is not stated as to where the download request went. The reason for this is that it is system dependent. The request could be to an SCP, or it could be to a Service Management System and it could be to either one of those directly, or through an intervening processor, or to another administration system.

Now, as shown in FIG. 7, there is described a process in which the SCP, or a processor on behalf of the SCP, has sent a set of instructions that is believed by the SCP to be needed locally on the call processor. This is shown in block 701. At block 702, the call processor checks to see which ones are, and which ones are not, available locally to the call processor. Unavailability can be because the data is not present, or stale, or not complete, etc., or can be because an external source, such as a network processing element, has determined (perhaps upon a review of the stored logic or upon review of a time stamp stored in association with the stored logic) that the shared logic is stale. In block 703 there is a request for download of the missing (or improper) service node set of instructions. And, at block 704, the call processor receives the download of the not available set of instructions. This download can come from any number of sources, such as the SCP, another administrative system, a caller, or any other database, including another intelligent processor or other service node.

In block 705 there is stored the downloaded set of instructions locally on the call processor for future availability. Note that the instructions can be downloaded not just on initialization, but including initialization and under program logic which may be periodic, daily, or under certain load conditions, or even under manual or programmed demand. This downloading process could be invoked at any time.

FIG. 8 is actually a little different triggering of the download, or synchronization, process. Under program or manual demand (or other of various conditions), the call processor, block 801, sends a list of service node instructions that are available for use by the permitted service control points. It may send this list to each one of the service control points, or it may send it to a service management system, or to an administrative system or to any number of other systems, or a combination thereof. This informs the service control points, or their auxiliaries, that a certain list of service node set of instructions are locally stored on the call processor.

In block 802, the call processor receives back the list of instructions that it sent. This list may be marked to include directions as to which instructions are needed, which are obsolete (outdated) and which cannot be used anymore. Also included can be instructions indicating which of the items on the list is going to be needed, which is not going to be needed and under what condition.

In block 803, once the system obtains an indication from the network which set of service node instructions are going to be useful and which ones are stale, the call processor has the ability to return (or purge) the extraneous instructions. In terms of the service node instructions, its local memory can be cleaned out or purged of the instructions that it doesn't need, or it makes arrangements for the purge to take place at a later point in time.

While it has been shown that the initiation of new instructions comes from internal to the call processor, such an initiation could come from an external source, such as a SCP, a SMS, or any other processor. This "external" initiation could then control the downloading of new or modified instructions. This initiation could be due to a change in instructions, a time expiration, or it could be due to a monitored response from this call processor where the response did not follow the "expected" pattern.

There have been described certain embodiments of a call processor to deliver calling services in accordance with the present invention. While these embodiments have been described and disclosed, other changes, substitutions, or alterations can be made without departing from the spirit and scope of the invention, as described in the appended claims.

What is claimed is:

1. A call processing system operable to deliver calling services to callers, said system comprising:
   a call processor for receiving from a service control point requests for a calling service and for executing said calling service when said call processor contains proper program logic pertaining to said calling service;
   wherein said call processor comprises:
      means for requesting from a source external to said call processor additional program logic pertaining to said calling service when said call processor does not contain said proper program logic pertaining to said calling service.

2. The call processing system as set forth in claim 1, wherein said requesting means includes:
   means for determining if said proper program logic is contained within said call processor,
      wherein, at certain time periods, said determining means determines whether program logic contained within said call processor is proper program logic.

3. The call processing system as set forth in claim 1, wherein said requesting means includes:
   means for determining if said proper program logic is contained within said call processor,
      wherein said determining means uses information received from said service control point to determine whether program logic contained within said call processor is said proper program logic.

4. The call processing system as set forth in claim 1, wherein said external source is said service control point.

5. The call processing system as set forth in claim 1, further comprising:
   a first database associated with the service control point for storing program logic to be sent to the call processor; and
   a second database associated with the call processor for storing program logic received from said service control point.

6. The call processing system as set forth in claim 5, wherein the second database is updated at predetermined intervals.

7. The call processing system as set forth in claim 6, wherein said updating is performed by purging preselected program logic.

8. The call processing system as set forth in claim 6, wherein said updating is performed by receiving preselected program logic.

9. The call processing system as set forth in claim 1, wherein said call processor comprises:
   an intelligent peripheral for performing caller services when requested by said service control point.

10. The call processing system as set forth in claim 1, further comprising:
    means for creating a service logic table associated with said call processor operable to store program logic.

11. The call processing system as set forth in claim 10, wherein said creating means includes means for allowing manipulation of vectors, objects, and events to construct said program logic.

12. The call processing system as set forth in claim 10, wherein said creating means includes a graphical interface that allows manipulation of vectors, objects, and events to construct a visual representation of the program logic.

13. The call processing system as set forth in claim 10, further comprising a service logic executive processor with access to said service logic table operable to execute said program logic.

14. The call processing system as set forth in claim 1, wherein said call processor receives said program logic without interruption of service by said call processor.

15. The call processing system as set forth in claim 1, further comprising at least one external server accessible by said call processor to provide information necessary to execute said program logic.

16. The call processing system as set forth in claim 1, wherein said call processor maintains a first program logic set operable to provide call services to said service control point and a second program logic set operable to deliver call services independent of said service control point.

17. A method for a call processor to deliver calling services to a caller, comprising the steps of:
   determining that said call processor does not contain proper logic pertaining to a calling service requested by a service control point (SCP);
   requesting that said SCP download program instructions defining said calling service to said call processor;
   downloading said program instructions from said SCP to said call processor; and
   executing said program instructions by said call processor.

18. The method as set forth in claim 17, further comprising the step of storing said downloaded program instructions in a database controlled by said call processor.

19. The method as set forth in claim 18, further comprising the step of updating said database at predetermined intervals,
   wherein said updating step comprises the step of requesting updated program instructions from a source outside of said call processor, and
   wherein said updated program instructions are downloaded to said database.

20. The method as set forth in claim 19, wherein said updating step further comprises the step of purging out-of-date program instructions from said database.

21. The method as set forth in claim 19, wherein said updating step is performed for a particular calling service.

22. The method as set forth in claim 19 wherein said outside source is said SCP.

23. The method as set forth in claim 17, wherein said executing step further comprises the steps of:
   accessing a service logic table generated by a computer input means coupled to said call processor; and
   executing said service logic table.

24. The method as set forth in claim 17, further comprising the step of accessing at least one external server accessible by the call processor to provide information necessary to execute the program instructions.

25. The method as set forth in claim 17 further comprising the step of:
   executing a stored program instruction from said database either as a result of a request from an SCP or by a request generated outside of said SCP.

26. The method as set forth in claim 17 wherein said requesting step includes the step of:
   said SCP requesting said download to said call processor to occur from a resource separate from said SCP.

27. The method as set forth in claim 26 wherein said separate resource is said call processor.

28. The method as set forth in claim 26 wherein said separate resource is also separate from said call processor.

29. A method of delivering calling services to a caller comprising the steps of:
   receiving a call from the caller at a switch of a telephone network;
   determining from an input received from said caller a need for a first calling service associated with the call;
   notifying a service control point of said telephone network of said need for said first calling service;
   establishing a communication link between said service control point and a call processor associated with said switch;
   transmitting a calling service request from said service control point to said call processor, said calling service request being operable to cause said call processor to execute said first calling service if said call processor contains service logic operable to execute said first calling service;
   if said call processor does not contain service logic necessary to execute said first calling service, then:
      sending a service logic request from said call processor to a source external to said call processor to transfer the necessary service logic to said call processor;
      transferring said necessary service logic from said external source to said call processor, and
      said call processor executing said first calling service using said necessary service logic.

30. The method as set forth in claim 29 including the further step of caching said necessary service logic transferred from said external source in a storage device associated with said call processor.

31. The method as set forth in claim 30 including the further step of purging selected ones of said cached service logic from said storage device from time to time.

32. The method as set forth in claim 31 wherein said purging step is accomplished at a time determined by the call processor.

33. The method as set forth in claim 31 wherein a purging time is determined from data transmitted to said call processor by a source external to said call processor.

34. The method as set forth in claim 31 wherein a purging time is selected with respect to the service logic for each calling service.

35. The method as set forth in claim 31 wherein the selected ones of said cached service logic to be purged are determined by data transmitted to said call processor under control of said service control point.

36. The method as set forth in claim 31 wherein the selected ones of said cached service logic to be purged are determined by monitoring the execution of a calling service by said processor.

37. The method as set forth in claim 29 wherein said service control point automatically transfers the service logic necessary to execute the first calling service to said call processor whenever said communications link is established between said service control point and said call processor.

38. The method as set forth in claim 29 including the further step of automatically sending from said service control point to said call processor a list of required calling services whenever a communications link is established between the service control point and the call processor.

39. The method as set forth in claim 38 wherein said call processor determines from a sent one of said lists any missing service logic needed to execute at least one required calling service; and under control of said determining step sends a service logic request to a source external to said call processor to transfer said determined missing service logic to said call processor.

40. The method as set forth in claim 39 wherein said external source transfers said determined missing service logic to said call processor in response to said service logic request.

41. The method as set forth in claim 29 including the further step of automatically sending from said call processor to said service control point a list of calling services having service logic stored at said call processor whenever said communications link is established between said service control point and said call processor.

42. The method as set forth in claim 41 wherein said service control point determines from said list of calling services which service logic is needed to execute any desired calling service; and under control of said determining step controls the transfer of said determined service logic to said call processor.

43. A system for delivering calling services to a caller, said system comprising:

means for receiving a call from a caller at a switch of a telephone network;

means for determining from an input received from said caller a need for a first calling service associated with said call;

means for notifying a service control point linked to said telephone network of said need for said first calling service;

means for transmitting a calling service request from said service control point to a call processor also linked with said switch;

said call processor comprising:

means operable in response to receipt of said calling service request for causing said call processor to execute said first calling service if said call processor contains proper service logic necessary to execute said first calling service;

means for determining if said call processor does not contain the proper service logic necessary to execute said first calling service; and means for sending a request from said call processor to a source external to said call processor to transfer the proper service logic from said external source to said call processor, wherein said request sending means operates when said determining means determines that said call processor does not contain said proper service logic.

44. The system as set forth in claim 43 further including:

means operable upon transferring said requested service logic to said call processor to cause said call processor to execute said first calling service.

45. The system as set forth in claim 43 further including:

a storage device associated with said call processor; and means for storing in said storage device said service logic transferred from said external source.

46. The system as set forth in claim 45 further including:

means for purging selected ones of said stored service logic from said storage device from time to time.

47. The system as set forth in claim 46 further including:

means for controlling said purging by said call processor.

48. The system as set forth in claim 46 further including:

means for controlling said purging from data transmitted to said call processor by said external source.

49. The system as set forth in claim 46 further including:

means for selecting a purging time with respect to the particular service logic for each calling service.

50. A method of delivering calling services to a caller, comprising the steps of:

sending a list of program instructions from a call processor to a network processing element;

examining, under control of said network processing element, said list of program instructions;

marking said list of program instructions to indicate which program instructions are required for future call processing by said call processor and which program instructions are obsolete; and updating program instructions in said call processor according to said marked list of program instructions.

* * * * *